United States Patent
Blanchard

[11] 3,911,680
[45] Oct. 14, 1975

[54] INTERMITTENT BIMETALLIC-OPERATED MOTOR

[75] Inventor: Curtis Blanchard, Osterville, Mass.

[73] Assignee: General Housewares Corporation, Stamford, Conn.

[22] Filed: Nov. 22, 1974

[21] Appl. No.: 526,233

[52] U.S. Cl. .................... 60/529; 46/116; 272/8 D
[51] Int. Cl.² ........................................... F03G 7/06
[58] Field of Search ............................ 60/527–531; 272/8 R, 8 D; 46/116

[56] References Cited
UNITED STATES PATENTS

| | | | |
|---|---|---|---|
| 3,152,554 | 10/1964 | Kofink | 60/529 X |
| 3,366,865 | 1/1968 | Shapiro | 60/529 X |
| 3,782,121 | 1/1974 | Marcoux et al. | 60/527 |

*Primary Examiner*—Martin P. Schwadron
*Assistant Examiner*—Allen M. Ostrager
*Attorney, Agent, or Firm*—Robert Ames Norton

[57] ABSTRACT

A light duty motor is operated by a bimetallic strip, fastened at one end and with a weight on the other, there being mounted under the bimetallic strip a source of heat which will rise in the form of radiant heat and hot air. An example is a candle flame. The weighted end of the bimetallic strip is connected through a wire which can both push and pull to a shutter, preferably L-shaped. At the start, with the bimetallic strip horizontal, the long leg of the shutter is in a channel in a support which is provided at the top with a lip. Heat from the flame causes the bimetallic strip to curve up, pulling up the shutter and, when it reaches the lip, permitting it to tip over so that it becomes positioned over the flame. This shuts off heat from the bimetallic strip, which then cools and resumes its position, first tipping up the shutter and then pushing it down into the channel. The L-shaped extension on the shutter serves as a further shield and keeps heat from the bimetallic strip for a longer time than would otherwise be the case. The wire, where it is attached to the end of the shutter, is provided with a driving pin which can transmit the power of the motor, for example, to a toy, such as a see-saw, or can turn a disc and shaft either continuously or intermittently. The weight on the end of the bimetallic strip is necessary because while there is sufficient power as the strip curls up, the weight of the strip is not sufficient to exert the necessary force as it cools.

8 Claims, 8 Drawing Figures

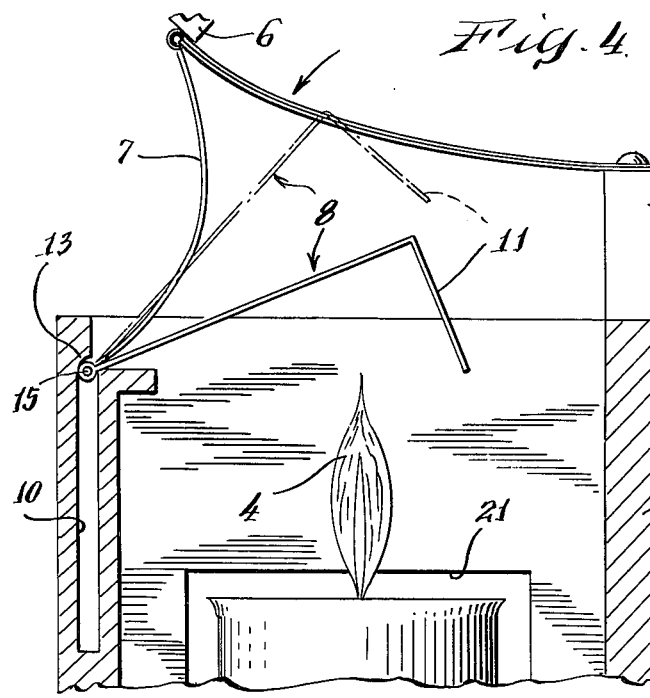
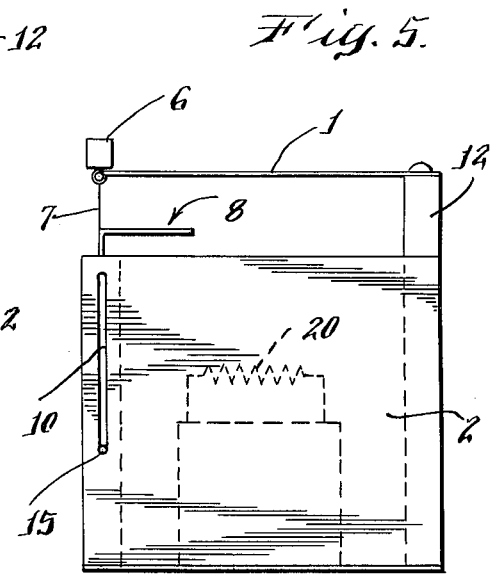
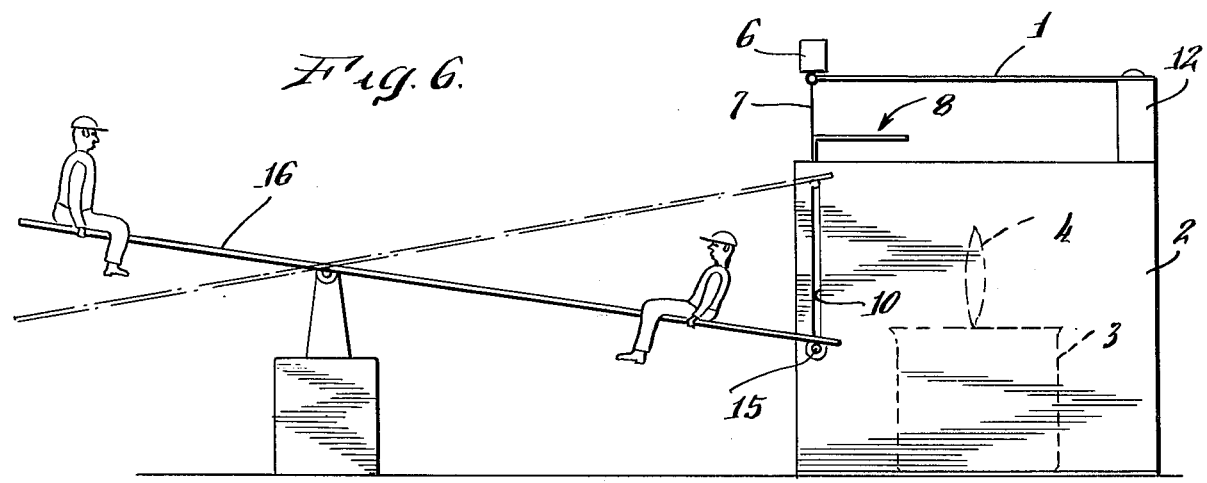
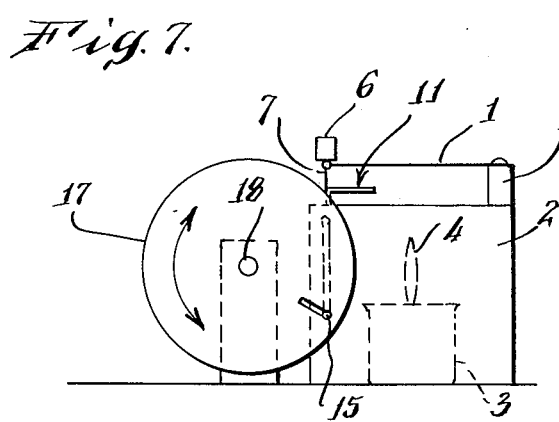
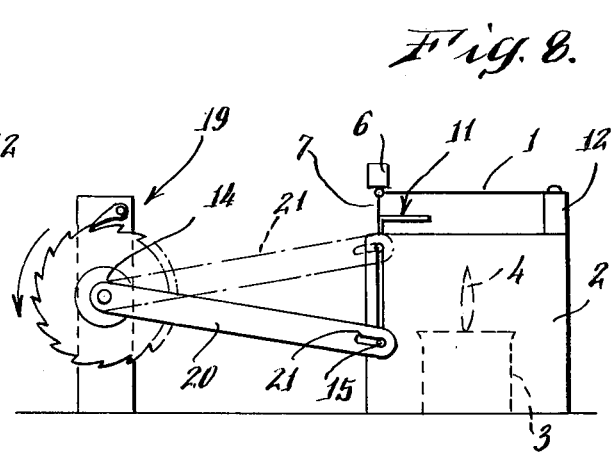

INTERMITTENT BIMETALLIC-OPERATED MOTOR

BACKGROUND OF THE INVENTION

Various bimetallic operated motors have been described. Most of them have a bimetallic strip in contact with a source of heat, such as a light bulb, and as it curves it passes beyond the center of gravity and moves to a position in which it is out of heat conducting contact with the source of heat. It then cools and returns to its position. Typical patents illustrating this type of motor are U.S. Pat. Nos. 2,690,050, Sept. 28, 1954, and 3,013,381, Dec. 29, 1961. These motors are not associated with any kind of shield. There is a U.S. Pat. No. Re. 22,774, July 30, 1946, which shows a stationary shield around the heat source. This operates under an entirely different principle from the present case as the stationary shield simply serves to separate cool air zones from hot air zones. No movable shutter is involved and the operation of the motor, which is a rotary operation, is quite different. The present invention deals with a particular combination including a movable shutter and is not directed to the broad concept of a motor actuated by a bimetallic element.

SUMMARY OF THE INVENTION

In the present invention there is a source of heat and a bimetallic strip above it, all supported by a suitable container. The source is one which when unshielded heats the bimetallic strip by radiant heat and rising hot air. The broader aspects of the present invention are not restricted to any particular source of radiant heat positioned so that hot air from it can rise and strike the bimetallic strip. In a more specific aspect a flame source, such as a candle, is included.

Essential elements of the present invention in addition to the fastening of the bimetallic strip at one end, which is described in the prior art, are a weight at the further end and a shutter which is swung up as the bimetallic strip curls up and shields it from radiant heat and rising hot air. The connection to the shutter from the weighted end of the bimetallic strip must be a wire or other element sufficiently stiff so that it can push as well as pull. As the bimetallic strip curves up, it pulls out a shutter in a channel and in its extreme position permits the shutter to tip over the edge of the channel and position itself above the flame or other source of heat. This removes heat from the bimetallic strip, which then straightens out. The weight at the end of the strip, however, is essential because the bimetallic strip is too light to exert sufficient force as the strip straightens out. When it curls up, there is suficient force to lift the weight and to position the shutter. As the bimetallic strip cools off, it pushes down the end of the shutter, causing the latter to tip up and, finally, to descend into the channel. This results in a much more rapid movement of the shutter as the heated bimetallic strip starts to curl and as it cools down. The movement in pushing the shutter into the channel is much slower.

An L-shaped shutter is preferred because when the bimetallic strip cools, if it were a straight shutter a small movement could permit hot air to rise around the edge of the shutter and start the bimetallic strip heating again before the cooling had gone through its full distance. The L-shaped end of the shutter keeps the bimetallic strip shielded from the hot air and radiant heat for a longer time as the shutter is raised on cooling and therefore permits an adequately long cooling cycle. The L-shaped shutter is, therefore, a preferred form although if properly dimensioned the invention is not inoperative with a straight shutter.

The alternating heating and cooling of the bimetallic strip is through a moderately short cycle, a few seconds, and this cycle can be somewhat altered by varying the weight on the end of the bimetallic strip and/or its position. A somewhat slower cycle results with a heavier weight and one that is at the extreme end of the bimetallic strip.

In order to transmit power so that the present invention operates as a motor, there is a pin or other element which may advantageously be mounted at or near the end of the wire where it attaches to one end of the shutter. The movement of the pin is primarily up and down. When the motor is used with a toy or light display in which an oscillating up and down motion is adequate, this makes for a very simple connection, for example to a toy see-saw in which one end of the see-saw is moved up and down as the motor operates. For other uses of the motor it is desirable to transform the up and down movement of the pin into a continuous or intermittent rotary motion. For this purpose the pin may be mounted eccentrically in a disc or similar element which is mounted on a shaft. The up and down motion causes oscillation of the disc, and for many toys or light displays this is what is desired. For certain other purposes it may be desired to transform the oscillatory motion of the shaft into a continuous rotation or a rotation in a continuous direction, which can be effected by suitable ratchet and pawl or similar connection.

It should be noted that the present invention is not directed to the broad idea of using bimetallic elements for causing movements. In addition to the illustrative patents referred to above in the background of the invention and which are more nearly relevant to the invention, bimetallic strips have been used for other purposes through an entirely different combination of mechanisms; for example a bimetallic strip which is wound with a heating wire may be used to cause intermittent flashing in a sign. The wires, of course, are connected so that when the sign switch is on from the movement of the bimetallic strip current flows through the wire, heating the bimetallic strip, and then when it has moved to a second position the switch is opened and it cools down. Of course, the use of spiral bimetallic strips in such instruments as thermostats, thermometers and the like is very well known but the actuation of such a device is with an entirely different mechanism and involves an entirely different combination of elements than in the present invention. In other words, the present invention is a combination of a number of elements which coact in a new way to perform a new result, and the patentability of the combination does not depend on the absolute novelty of any single element of the combination.

BRIEF DESCRIPTION OF THE DRAWINGS

FIG. 4 is a section similar to FIG. 2 showing the shutter just starting to raise;

FIG. 5 illustrates a different heat source;

FIG. 6 illustrates the operation of a simple toy, a seesaw;

FIG. 7 is a detail of pin and disc to transform the up and down motion of the present invention into a rotary one, and FIG. 8 illustrates a detail of a continuous rotary motion.

DESCRIPTION OF THE PREFERRED EMBODIMENTS

Figure 1:
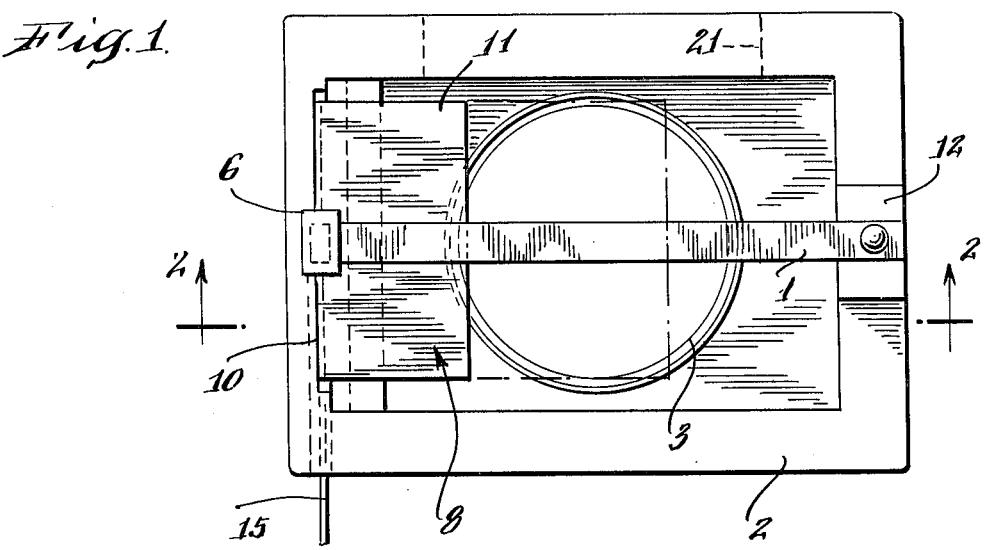
FIG. 1 is a top view of a container carrying the motor of the present invention.
Figure 2:
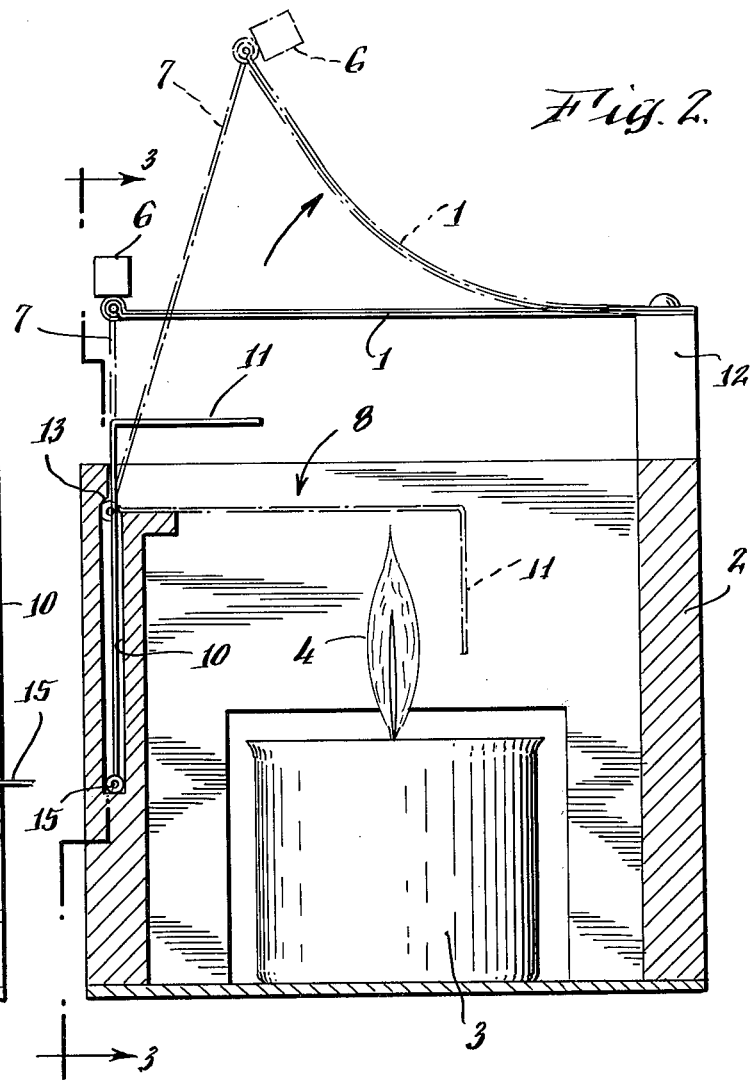
FIG. 2 is a cross-section through FIG. 1 along the line 2—2.

Considering primarily FIG. 2, which is the best single illustrating figure of the invention, there is a bimetallic strip 1 attached at one end to a side 12 of the container 2 or to a pillar. Mounted below the bimetallic strip is a candle 3 with a flame 4. This causes radiant heat and rising hot air to contact the bimetallic strip. As can be seen from FIG. 1, the bimetallic strip does not close the whole of the top of the container. This causes the bimetallic strip, which is provided with a weight 6 on its free end, to curl up. The same free end is connected through a wire 7 to an edge of a shutter 8 in a channel 10. The shutter has an L-shaped extension 11 and the curling of the bimetallic strip first pulls up the shutter slowly in the channel and then when it reaches the top, where there is a lip 13, the shutter falls over the flame and shields the bimetallic strip from heat. This position of the curled up bimetallic strip and shutter is shown in dotted lines in FIG. 2.

As can be seen from FIG. 1, the shutter 8 is much wider than the bimetallic strip and does not just shield it from radiant heat but also from most hot air rising from the candle flame.

When the bimetallic strip is shielded, it begins to cool down and straightens out, finally reaching the starting position, which is shown in full lines in FIG. 2. This at first raises the shutter quite rapidly and then slowly moves it down the channel. At the end of the wire there is a pin 15 which serves to transmit the power from the alternate curling and uncurling of the bimetallic strip, as will be described below.

While being heated, the bimetallic strip is capable of exerting a fair amount of force, a number of ounces, for the present invention is primarily a low powered motor, but its weight is insufficient to exert sufficient force as it cools down and that is the purpose of the weight 6, which can also adjust the timing of the cycle. It will be seen that the shutter is moved more rapidly when it reaches the top of the channel and in the other phase of operation when it is being raised with the cooling of the bimetallic strip. This permits a relatively much longer period during which the shutter is either completely shielding the bimetallic strip in one phase or completely free so that the strip is heating.

While it is desirable to have the shutter moved more rapidly at the beginning or end of its cycle, it is undesirable to permit the escape of hot air around its edge as it rises slightly, which would be the case with a flat horizontal shutter. The L-shaped extension 11 keeps the bimetallic strip shielded for a longer period of time, which smooths out the cycle.

The pin 15 actuates mechanism to be driven by the motor. For example, in FIG. 6 this is shown as a seesaw 16 in a child's toy. The other figures of the drawing illustrate transforming the up and down motion of the pin 15 into rotary motion by being located eccentrically in a disc 17 turning a shaft 18. This will produce oscillating rotary motion, but if it is desired to have rotary motion continuously in one direction this is shown in FIG. 8 by means of a suitable conventional ratchet drive 19.

Figure 3:
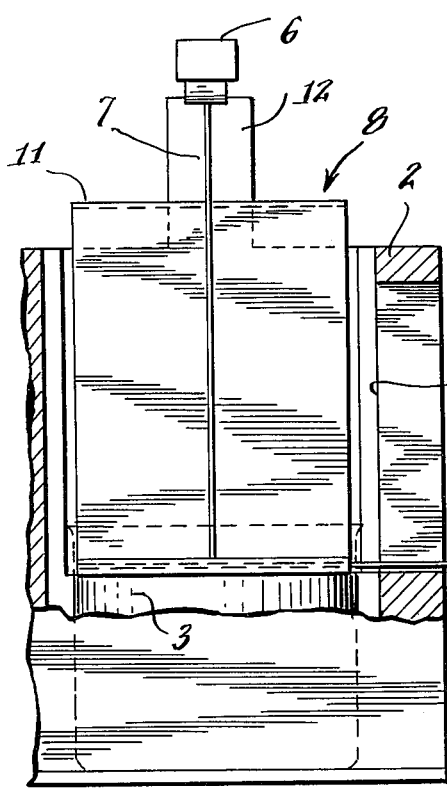
FIG. 3 is an end view or side view of the container.

FIG. 5 also shows a detail of another type of heat source, namely a glowing wire 20. This produces radiant heat and also rising hot air just as does a flame, such as a candle flame. The operation, of course, is the same. A candle is a preferred form of heat source, and as can be seen in FIGS. 2 and 3, there is an opening 21 in the side of the container near its bottom so that a candle can be inserted. These candles are preferably rather short and the illustration is of a type of candle referred to in the trade as a votive candle. Other sources of heat may be used. The essential features of the invention are the placement of the heat source below a normally horizontal bimetallic strip fastened at one end, the weight on the end of the strip, and the connection at this point through a wire to the end of a shutter. In more specific aspects the L-shaped shutter is included.

I claim:

1. A bimetallic actuated motor comprising, in combination, a bimetallic strip mounted at one end with a weight at the free end, source of heat positioned below the bimetallic strip and, when unshielded therefrom, permitting radiant heat and rising hot air to strike the strip, a shutter of dimensions wider than the bimetallic strip and capable when positioned over the source of heat to shield the bimetallic strip from heat, a flexible element having sufficient stiffness to push attached to the free end of the bimetallic strip and at its other end to an edge of the shutter, a channel in which the element and shutter fit when the bimetallic strip is in its cooled position, and an opening at the top of the channel permitting the shutter when raised to tip over the source of heat, a driving pin projecting from the element connecting strip to shutter which moves up and down therewith, whereby when heat strikes the bimetallic strip it bends or curls up, pulling up the shutter in the channel and causing it to tip over the source of heat, shielding the bimetallic strip therefrom and permitting cooling.

2. A device according to claim 1 in which the shutter is L-shaped whereby when it starts to lift with cooling the L leg continues the shielding of the bimetallic strip from heat for a longer period than would be the case if the shutter were a flat horizontal strip.

3. A device according to claim 1 in which the source of heat is a flame.

4. A device according to claim 3 in which the source of heat is a candle with the flame positioned below the strip when the candle is lighted.

5. A device according to claim 1 in which there is provided a disc, the driving pin being mounted eccentrically therein, whereby up and down motions of the pin produce rotation of the disc.

6. A device according to claim 2 in which there is provided a disc, the driving pin being mounted eccentrically therein, whereby up and down motions of the pin produce rotation of the disc.

7. A device according to claim 3 in which there is provided a disc, the driving pin being mounted eccentrically therein, whereby up and down motions of the pin produce rotation of the disc.

8. A device according to claim 4 in which there is provided a disc, the driving pin being mounted eccentrically therein, whereby up and down motions of the pin produce rotation of the disc.

* * * * *